United States Patent [19]

Lin

[11] Patent Number: 5,190,827
[45] Date of Patent: Mar. 2, 1993

[54] SILICONE PRESSURE SENSITIVE ADHESIVE COMPOSITIONS HAVING HIGH SOLIDS CONTENT

[75] Inventor: Shaow B. Lin, Schenectady, N.Y.

[73] Assignee: General Electric Company, Waterford, N.Y.

[21] Appl. No.: 675,396

[22] Filed: Mar. 26, 1991

[51] Int. Cl.$^5$ .................................................. B32B 9/04
[52] U.S. Cl. .................................... 428/447; 525/477; 528/31; 528/32; 528/15
[58] Field of Search ...................... 525/477; 528/15, 31, 528/32; 428/447

[56] References Cited

U.S. PATENT DOCUMENTS

| | | | |
|---|---|---|---|
| 4,293,671 | 10/1981 | Sasaki et al. | 525/478 |
| 4,774,297 | 9/1988 | Murakami et al. | 525/478 |
| 4,988,779 | 1/1991 | Medford et al. | 525/478 |

FOREIGN PATENT DOCUMENTS 0269454 6/1988 European Pat. Off. .
0355991 2/1990 European Pat. Off. .

*Primary Examiner*—Melvyn I. Marquis
*Assistant Examiner*—M. W. Glass

[57] ABSTRACT

A solventless or high solids-containing organopolysiloxane composition curable to produce a pressure sensitive adhesive having high tack and hig peel adhesion, comprising (A) a toluene soluble, resinous copolymer comprising $R_3SiO_{\frac{1}{2}}$ units and $SiO_{4/2}$ units; (B) an alkenyl-terminated polydiorganosiloxane having a viscosity of from about 10 to about 500 centipoise at 25° C.; (C) from 0 to about 90 mole % of a hydride-terminated organohydrogenpolysiloxane having a viscosity of from about 10 to about 1000 centipoise at 25° C.; (D) from about 10 to about 100 mole % of a hydrogen-containing polydiorganosiloxane crosslinking agent; the combined average hydride equivalent weight of (C) and (D) being at least 1500 grams/silicon-bonded hydrogen atom; the mole percentages of (C) and (D) being based on the total silicon-bonded hydrogen content of (C) and (D); the total of (B), (C) and (D) being from about 25 to about 50 parts by weight; the total of (A), (B), (C) and (D) being 100 parts by weight; the ratio of silicon-bonded hydrogen atoms in (C) and (D) to olefinically unsaturated radicals in the total of (A) and (B) being in the range of from about 1.1:1 to about 15.0:1; (E) a catalytic amount of a hydrosilation catalyst; and (F) from 0 to about 40% by weight of an organic solvent.

42 Claims, No Drawings

SILICONE PRESSURE SENSITIVE ADHESIVE COMPOSITIONS HAVING HIGH SOLIDS CONTENT

CROSS REFERENCE TO RELATED APPLICATIONS

Reference is made to the concurrently filed applications identified as Ser. No. 07/675,232 and Ser. No. 07/675,380, both filed on Mar. 26, 1991.

BACKGROUND OF THE INVENTION

The present invention relates to silicone compositions suitable for forming pressure sensitive adhesive compositions. More particularly, the present invention relates to low viscosity, addition-curable silicone compositions which have a high solids content and which cure to form pressure sensitive adhesive compositions having excellent tack and peel adhesion properties.

The term "pressure sensitive adhesive" (PSA) as used herein refers to adhesives that can be adhered to a surface and yet can be stripped from the surface without transferring more than trace quantities of adhesive to the surface, and can be readhered to the same or another surface because the adhesive retains some or all of its tack and adhesive strength.

Silicone pressure sensitive adhesives have an excellent adhesive strength, tack, and cohesive strength, which are the properties required of a pressure sensitive adhesive. In addition, they also have the heat resistance, cold resistance, electrical properties, and the like, characteristic of silicones, and so are widely used for electrical-insulating tape, which must be highly reliable, and for various pressure-sensitive products which must be resistant to hot and cold.

A drawback associated with the use of silicone pressure sensitive adhesives is the use, handling, and emission of flammable and volatile organic compounds, e.g., organic solvents, in the preparation of the pressure sensitive adhesives from compositions containing high levels of organic solvent. Solvent is generally used for the purpose of reducing the viscosity of the composition to a level which renders the curable composition processable. It is desirable, therefore, to provide solventless or high solids containing (i.e., low solvent-containing) polydiorganosiloxane compositions for use in the preparation of pressure sensitive adhesives.

Another drawback associated with conventional pressure sensitive adhesives is the requirement for a high temperature, e.g., 165° C., to effectively cure the pressure sensitive adhesive using a peroxide catalyst. Such pressure sensitive adhesives cannot be used on substrates sensitive to high temperatures, for example, polyolefin-backed substrates, due to their temperature incompatibility.

Addition-curable silicone compositions capable of curing to form pressure sensitive adhesive compositions are known in the art.

European Patent Application No. 0355991 (Boardman) is directed to a pressure sensitive adhesive composition having a high solids content, i.e., typically in excess of 95% by weight, preferably in excess of 98% by weight, comprising (a) a benzene soluble resinous copolymer consisting of $R^1R^{11}R^{111}SiO_{\frac{1}{2}}$ units and $SiO_{4/2}$ units and containing silicon-bonded hydroxyl radicals ranging from 1 to 4 percent by weight of the copolymer, (b) a diorganoalkenylsiloxy endblocked polydiorganosiloxane, (c) a diorganohydrogensiloxy endblocked polydiorganosiloxane, (d) a crosslinking agent, and (e) a hydrosilation catalyst. The crosslinking agent used in Boardman is selected from low and high molecular weight polyorganosiloxanes having the general formulae

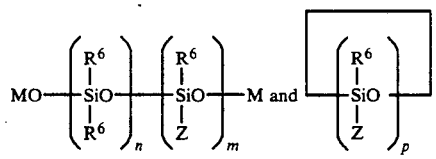

wherein each $R^6$ represents a monovalent saturated hydrocarbyl group, n and m are each numbers from 0 to about 1000, p represents 3 or 4, Z is a vinyl radial or hydrogen, and M is a silyl group selected from $R^aR^bR^cSi$ and $R^dR^eZSi$, wherein $R^a$, $R^b$, $R^c$, $R^d$, and $R^e$ are each monovalent saturated hydrocarbyl groups. The ratio of the total number of alkenyl groups present in (d) and (b) to the total number of silicon-bonded hydrogen atoms present in (d) and (c) ranges from 0.8 to 1.2, i.e., the ratio of the total number of silicon-bonded hydrogen atoms to the total number of alkenyl groups ranges from 0.83–1.25:1. The Examples presented in Boardman show that the pressure sensitive adhesives prepared therein had low to moderate tack properties. The Boardman patent does not teach that useful pressure sensitive adhesive properties (especially tack) can be obtained at SiH/SiVinyl ratios of greater than 1.25:1. It would be desirable to provide solventless or high solids-containing pressure sensitive adhesives having higher tack properties as well as high peel adhesion. Furthermore, the Boardman patent does not disclose the connection between the combined hydride equivalent weight of the hydride-containing polydiorganosiloxane crosslinker and the hydride-terminated polydiorganosiloxane fluid and the ultimate PSA properties.

U.S. Pat. No. 3,983,298 (Hahn et al.) is directed to a composition suitable for use as a pressure sensitive adhesive and obtained by mixing components consisting essentially of (a) 50–60 parts by weight of a solid, benzene-soluble resin copolymer consisting essentially of $R_3SiO_{\frac{1}{2}}$ units and $SiO_{4/2}$ units, (b) 40–50 parts by weight of a vinyl-terminated polydiorganosiloxane having a viscosity of from 20,000 to 100,000 centipoise at 25° C., (c) a hydrogen-containing organopolysiloxane in an amount sufficient to provide from 1.0 to 20.0 silicon-bonded hydrogen atoms of every olefinically unsaturated radical in the total of (a) plus (b), and (d) a platinum-containing catalyst. It is pointed out in Hahn et al. that compositions of the prior art based on mixtures of a benzene soluble resin copolymer containing $R_3SiO_{\frac{1}{2}}$ units and $SiO_{4/2}$ units (hereinafter sometimes referred to as "MQ resin") and low viscosity silicones do not form pressure sensitive adhesive compositions.

U.S. Pat. No. 4,774,297 (Murakami et al.) teaches the preparation of pressure sensitive adhesives using vinyl functional polysiloxanes having even higher viscosity than those used in the Hahn et al. patent discussed above. The patent to Murakami et al. is directed to a composition suitable for forming a pressure sensitive adhesive having excellent tack and adhesive strength, comprising (A) 30–70 parts by weight of a vinyl-terminated polydiorganosiloxane having a viscosity of at least 500,000 centipoise at 25° C., (B) 70–30 parts by weight of an organopolysiloxane containing $R_3SiO_{\frac{1}{2}}$ units and $SiO_{4/2}$ units, (C) an organohydrogensiloxane in an amount sufficient to provide 1–20 silicon-bonded hydrogen atoms per alkenyl group, (D) a platinum-containing catalyst, and (E) from 25–400 parts by weight of an organic solvent. In order to obtain a satisfactory product, Murakami et al. teach that it is essential that the vinyl polymer have a viscosity of at least 500,000 centipoise and preferably at least one million centipoise at 25° C.

European Patent Application No. 0269454 (Murakami et al.) discloses a composition suitable for forming a pressure sensitive adhesive having excellent tack and adhesive strength and comprising an alkenyl group-containing silicone polymer, a tackifying silicone resin, an organohydrogensiloxane, and a platinum-containing catalyst. According to the Murakami et al. (Murakami) reference, there is no specific restriction on the molecular weight of the alkenyl group-containing silicone polymer as long as no adverse effect accrues with respect to the workability of the pressure sensitive adhesive composition. If the pressure sensitive adhesive composition is solventless, the viscosity of the alkenyl group-containing silicone polymer is no more than 100,000 centipoise at 25° C. In a solvent-containing composition, the alkenyl group-containing silicone polymer should have a viscosity of at least one million centipoise at 25° C. The organohydrogenpolysiloxane should be present in an amount sufficient to provide 1 to 40 silicon-bonded hydrogen atoms per alkenyl group in the composition. The patent to Murakami et al. does not disclose a pressure sensitive adhesive composition using low viscosity vinyl-functional silicones wherein the composition has excellent peel adhesion and high tack properties.

U.S. Pat. No. 4,988,779 (Medford et al.) disclose a composition suitable for forming a pressure sensitive adhesive, the composition having a solvent content of no more than 5–10% by weight and comprising from 30 to 50 parts of a vinyl endblocked polydiorganosiloxane fluid having a viscosity of from 500 to 10,000 centipoise at 25° C., from 50 to 70 parts of a benzene soluble resin copolymer containing $R_3SiO_{\frac{1}{2}}$ units and $SiO_{4/2}$ units, an organopoly-siloxane having silicon bonded hydrogen atoms, and a platinum catalyst. The hydrogen-containing organopolysiloxane is present in an amount sufficient to provide from 1.0 to 30.0 silicon bonded hydrogen atoms for every olefinically unsaturated radical in the composition. Although the composition disclosed in the Medford et al. patent uses a low viscosity vinyl-functional silicone, it is continually desirable to provide pressure sensitive adhesive compositions which use even lower viscosity vinyl-functional silicones.

It is continually desirable to provide solventless or high solids-containing, addition-curable polydiorganosiloxane compositions which cure to yield silicone pressure sensitive adhesives having high tack and excellent peel adhesive strength. It is further desirable to provide solventless or high solids-containing, addition-curable silicone pressure sensitive adhesive compositions which can be cured at relatively low temperatures to yield silicone pressure sensitive adhesives having high tack and excellent peel adhesive strength.

In the present invention, it was found that an addition-curable silicone composition containing a vinyl-terminated polydiorganosiloxane having a viscosity of less than 500 centipoise at 25° C. can be cured at relatively low temperature to form pressure sensitive adhesives with both high tack and high peel adhesion, if a particular type of external hydride crosslinking agent is used, if the combined average hydride equivalent weight of the hydride crosslinking agent and the hydride silicone fluid in the addition-curable composition are within a certain range, and if the ratio of silicon-bonded hydrogen groups to silicon-bonded alkenyl groups is within the ranges of the present invention. Unexpectedly, such compositions at critical average hydride equivalent weight (HEW) levels can be obtained at relatively low viscosity from proper design and selection of the hydride-terminated fluid and the hydride crosslinker fluid.

SUMMARY OF THE INVENTION

The present invention provides an organopolysiloxane composition curable to produce a pressure sensitive adhesive having high tack and high peel adhesion, comprising by weight:

(A) from about 50 to about 75 parts by weight of a toluene soluble, resinous copolymer comprising $R_3SiO_{\frac{1}{2}}$ units and $SiO_{4/2}$ units wherein R is a group selected from alkyl groups and alkenyl groups, wherein the resinous copolymer comprises from about 0.2% to about 5.0% by weight, based on the total weight of the copolymer, of hydroxyl radicals, at least 95% of all R groups being an alkyl group, the total number of R radicals that are alkenyl radicals being 0–0.5% of all R radicals, the molar ratio of $R_3SiO_{\frac{1}{2}}$ units to $SiO_{4/2}$ units being from about 0.6 to about 0.9 inclusive;

(B) an alkenyl-terminated polydiorganosiloxane having a viscosity of from about 10 to about 500 centipoise at 25° C. and having the general formula

$$R^2R^1{}_2SiO(R^3{}_2SiO)_mSiR^1{}_2R^2 \quad (I)$$

wherein each $R^1$ is independently an alkyl group having from 1 to about 10 carbon atoms or an aryl group, $R^2$ is an alkenyl group having from 1 to about 10 carbon atoms, each $R^3$ is independently $R^1$ or $R^2$, with the proviso that at least 99.5% of all $R^3$ radicals are $R^1$, "m" is a number in the range of from about 1 to about 300;

(C) from about 0 to about 90 mole % of a hydride-terminated organohydrogenpolysiloxane, the mole % of (C) being based on the total silicon-bonded hydrogen content of (C) and (D), wherein (C) is compatible with the mixture of (A) and (B), has a viscosity of from about 10 to about 1000 centipoise at 25° C., and has the general formula

$$R^4{}_2HSiO(R^5{}_2SiO)_aSiHR^4{}_2 \quad (II)$$

wherein each $R^4$ independently an alkyl group having from 1 to about 10 carbon atoms or an aryl group, and each $R^5$ is hydrogen or $R^4$, with the proviso that at least 99.5% of all $R^5$ radicals are $R^4$, "a" is a number in the range of from 1 to about 500, there being at least two silicon bonded hydrogen atoms per molecule of (C), no silicon atom bearing more than one silicon bonded hydrogen atom;

(D) a hydrogen-containing polydiorganosiloxane containing more than 2 silicon-bonded hydrogen atoms per chain and being present in an amount such that (D) has a silicon-bonded hydrogen content of from about 10 to about 100 mole % based on the total silicon-bonded hydrogen content of (C) and (D), wherein (D) is selected from the group consisting essentially of (1) linear hydrogen-containing polydiorganosiloxane fluids having a viscosity of from about 5 to about 12,000 centipoise at 25° C., a hydride equivalent weight of from about 60 to about 10,000, and the general formula

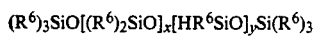

wherein $R^6$ is an alkyl radical having from about 1 to about 10 carbon atoms or an aryl radical, "x" is a number in the range of from about 0 to about 800, and "y" is a number in the range of from about 3 to about 100;

(2) resinous hydrogen-containing siloxane copolymers selected from the group consisting essentially of:
  (a) resinous hydrogen-containing siloxane copolymers comprising by weight:
    (i) from about 60% to about 100% of $SiO_{4/2}$ units and $(R^7)_2HSiO_{\frac{1}{2}}$ units; wherein the ratio of $(R^7)_2HSiO_{\frac{1}{2}}$ units to $SiO_{4/2}$ units is from about 0.6:1 to about 2:1; and
    (ii) from 0 to about 40% of $(R^7)_3SiO_{\frac{1}{2}}$ units and $(R^7)_2SiO_{2/2}$ units; and
  (b) resinous hydrogen-containing siloxane copolymers comprising by weight:
    (i) from about 30% to about 100% of $R^7SiO_{3/2}$ units and $(R^7)_2HSiO_{\frac{1}{2}}$ units; wherein the ratio of $(R^7)_2HSiO_{\frac{1}{2}}$ units to $R^7SiO_{3/2}$ units is from about 0.6:1 to about 2:1; and
    (ii) from 0 to about 70% of $(R^7)_3SiO_{\frac{1}{2}}$ units and $(R^7)_2SiO_{2/2}$ units;

wherein $R^7$ is a monovalent hydrocarbon radical having from 1 to about 6 carbon atoms, at least 95% of all $R^7$ groups being an alkyl group, the resinous siloxane copolymer having a hydride content of from about 0.05% to about 1.2% by weight and a hydride equivalent weight of from about 80 to about 2000; and the total of (B), (C) and (D) being from about 25 to about 50 parts by weight; the total of (A), (B), (C) and (D) being 100 parts by weight; the ratio of silicon-bonded hydrogen atoms in (C) and (D) to olefinically unsaturated radicals in the total of (A) and (B) being in the range of from about 1.1:1 to about 15.0:1; (C) and (D) having an average hydride equivalent weight of at least 1500 grams/silicon-bonded hydrogen atom based on the total of silicon-bonded hydrogen atoms in (C) and (D);
(E) a catalytic amount of a hydrosilation catalyst; and
(F) from 0 to about 40% by weight of an organic solvent.

The composition of the present invention cures to form a pressure sensitive adhesive having a tack of greater than 200 grams/cm², preferably greater than 400 grams/cm² and a peel adhesion strength greater than 25 ounces/inch, preferably greater than 30 ounces/inch. Furthermore, although solvent can be present in the composition, the composition does not require the presence of a solvent to improve workability in the uncured state. A key benefit of this invention is that a pressure sensitive adhesive having the high tack and peel adhesion values recited above can be obtained by curing the curable composition at a relatively low temperature for less than 5 minutes.

DETAILED DESCRIPTION OF THE INVENTION

The term "hydride equivalent weight" or "HEW" is used herein to denote the value obtained by dividing the molecular weight of the compound in question by the number of silicon-bonded hydrogen atoms bonded to the chain. For example, a compound designated by the formula

which has a molecular weight of 9662 grams and contains 2 silicon-bonded hydrogen atoms bonded to the chain, will have a hydride equivalent weight of 4831 grams/silicon-bonded hydrogen atom, i.e., 9662/2. For silicones, the hydride equivalent weight is a measure of the silicone chain length between two reactive silicon-bonded hydrogen atoms.

The term "average combined hydride equivalent weight" (designated as {HEW}), for example, when used in connection with the hydride equivalent weights of components (C) and (D), is calculated as follows:

{HEW} = [mole fraction of (C) × HEW of (C)] + [mole fraction of (D) × HEW of (D)].

The term "mole fraction", for example, with regard to component (C) refers to the number of moles of (C) per 100 moles of (C)+(D), and is calculated by dividing the number of moles of (C) per 100 moles of (C)+(D) by 100, e.g., if component (C) is present at 80 moles and component (D) is present at 20 moles, the mole fraction of (C) would be 0.80 and the mole fraction of (D) would be 0.20.

For reasons discussed hereinbelow, the average combined hydride equivalent weight of the crosslinker (D) and the hydride fluid (C) or of (D) alone in the absence of (C) used in the compositions of the present invention is critical to obtaining high peel adhesion and high tack after cure at relatively low temperature. In addition, as will also be discussed hereinbelow, the ratio of silicon-bonded hydrogen atoms in (C) and (D) to olefinically unsaturated radicals in (A) and (B) is critcal to obtaining excellent pressure sensitive adhesive properties at low temperature cure.

Component (A) of the composition of the present invention is a toluenesoluble, resinous organopolysiloxane copolymer which imparts tack to the cured pressure sensitive adhesive prepared from the composition. The resinous copolymer (A) comprises $R_3SiO_{\frac{1}{2}}$ units and $SiO_{4/2}$ units wherein R is a monovalent hydrocarbon radical having from 1 to about 6 carbon atoms. Examples of radicals represented by R include alkyl radicals such as methyl, ethyl, and isopropyl; cycloaliphatic radicals such as cyclopentyl and cyclohexenyl; olefinic radicals, such as vinyl and allyl; and the phenyl radical. At least, 99.5% of all R groups are alkyl groups, preferably methyl. The molar ratio of $R_3SiO_{\frac{1}{2}}$ units to $SiO_{4/2}$ units is from about 0.6 to about 0.9 inclusive. The resinous copolymer comprises from about 0.2% to about 5.0% by weight, preferably from about 1.0 to about 3.0% by weight, based on the total weight of the copolymer, of hydroxyl radicals. The hydroxyl radicals are bonded directly to the silicon atom of the $SiO_{4/2}$ units or the $R_3SiO_{\frac{1}{2}}$ units.

Methods for making the resinous copolymer (A) are known in the art. Reference is made, for example, to U.S. Pat. No. 2,676,182 to Daudt et al., which is hereby incorporated by reference herein. In the Daudt et al. method, a silica hydrosol is reacted under acidic conditions with a source of triorganosiloxy units such as a hexaorganodisiloxane, e.g., hexamethyldisiloxane, or a hydrolyzable triorganosilane, e.g., trimethylchlorosilane, or mixtures thereof, and recovering a benzene soluble resin copolymer having M and Q units.

Component (A) is present in the composition of this invention in an amount ranging from about 50 to about 75, preferably from about 50 to about 70, and most preferably from about 55 to about 62, parts by weight.

The resinous copolymer (A) is a solid, resinous material and is most often available as a solution in a solvent such as xylene or toluene, generally as a 40% to 60% by weight solution. For ease of handling of the composition of the present invention, one part of the solution of the resinous copolymer is usually dissolved in some or all of the vinyl chain-stopped polysiloxane (B) and the other part of the solution of the resinous copolymer is usually dissolved in some or all of the hydride containing polysiloxanes (C) and (D) and the solvent stripped from each of the resulting solutions to produce solutions of resinous copolymer (A) in the vinyl-chainstopped polysiloxane (B) and in the hydride-containing polysiloxanes (C) and (D). The solution of (A) and (B) typically contains from about 50 to about 75, preferably from about 50 to about 70, and most perferably from about 55 to about 62, parts by weight, of (A), and from about 25 to about 50, perferably from about 30 to about 46, and most preferably from about 38 to about 45 parts by weight, of (B). The solution of (A), (C) and (D) typically contains from about 50 to about 75, preferably from about 50 to about 70, and most preferably from about 55 to about 62, parts by weight, of (A), and from about 30 to about 46, preferably from about 30 to about 50, and most preferably from about 38 to about 45 parts by weight, of (C) and (D).

Component (B) of the composition of the present invention is an alkenyl-terminated polydiorganosiloxane having a viscosity of from about 10 to about 500 centipoise at 25° C. and having the general formula $$R^2R^1_2SiO(R^3_2SiO)_mSiR^1_2R^2 \quad (I)$$

wherein each $R^1$ is independently an alkyl group having from 1 to about 10 carbon atoms or an aryl group, $R^2$ is an alkenyl group having from 1 to about 10 carbon atoms, each $R^3$ is independently $R^1$ or $R^2$, at least 99.5% of all $R^3$ radicals being $R^1$, and "m" is a number from about 1 to about 300.

In formula (I), $R^1$ is an alkyl group such as methyl, ethyl, and propyl; or aryl group such as phenyl. Preferably, at least 95 percent and most preferably 100 percent of all $R^1$ radicals are alkyl radicals having from 1 to about 10 carbon atoms, and most preferably methyl. $R^2$ is an alkenyl group such as vinyl, allyl, propenyl, or hexenyl. Preferably, $R^2$ is vinyl. Each $R^3$ is either $R^1$ or $R^2$, with the proviso that at least 99.5%, and preferably 100%, of all $R^3$ radicals are $R^1$. Like $R^1$, $R^3$ is preferably an alkyl radical having from 1 to about 10 carbon atoms, and most preferably methyl. The presence of silicon-bonded alkenyl groups on the internal silicon atoms of the polymer chain of formula (I) constitute impurities which are preferably absent or present only in minor amounts. In formula (I), "m" represents a number from about 1 to about 300, preferably from about 20 to about 250, and most preferably from about 60 to about 200.

The viscosity of the alkenyl-terminated polydiorganosiloxane (B) ranges from about 10 to about 500, preferably from about 20 to about 400, and most preferably from about 100 to about 300, centipoise at 25° C.

Alkenyl-terminated polydiorganosiloxanes (B) can be prepared by any of the conventional methods for preparing triorganosiloxane-terminated polydiorganosiloxanes. For example, a proper ratio of the appropriate hydrolyzable silanes, e.g., vinyldimethylchlorosilane and dimethyldichlorosilane, may be cohydrolyzed and condensed or alternately an appropriate 1,3-divinyltetraorganodisiloxane, e.g., symmetrical divinyldimethyldiphenylsiloxane or divinyltetramethylsiloxane, which furnishes the endgroups of the polydiorganosiloxane, may be equilibrated with an appropriate diorganopolysiloxane, e.g., dimethylcyclotetrasiloxane, in the presence of an acidic or basic catalyst. Regardless of the method of preparation of polydiorganosiloxane (B), there is usually coproduced a varying quantity of volatile, cyclic polydiorganosiloxanes. Volatile cyclic polydiorganosiloxanes, e.g., methyl tetramer, should be removed, since they are volatile and adversely affect pressure sensitive adhesive properties.

The amount used of polydiorganosiloxane (B), its formula (presented hereinabove as formula (I)), and its viscosity, for the purposes of this invention, refers to the essentially cyclic free portion of the polydiorganosiloxane. This essentially cyclic free portion can be determined by heating a sample of the polydiorganosiloxane at 150° C. for up to 1 hour to yield a residue. This residue will be essentially free of cyclic material with the exception of trace quantities of macrocyclic polydiorganosiloxanes which are non-volatile at 150° C. and atmospheric pressure. Many of these polydiorganosiloxanes (B) are commercially available. Furthermore, component (B) can be homopolymers or copolymers or their several mixtures as long as they are alkenyl-endblocked polysiloxanes of formula (I).

Component (C) is a hydrogen-terminated polydiorganosiloxane compatible with the mixture of (A), (B) and (D) and having the general formula $$R^4_2HSiO(R^5_2SiO)_aSiHR^4_2 \quad (II)$$

wherein each $R^4$ is independently an alkyl group having from 1 to about 10 carbon atoms or an aryl group, each $R^5$ is independently either $R^4$ or a hydrogen radical, with the proviso that at least 99.5%, and preferably 100%, of all $R^5$ radicals are $R^4$. Preferably, $R^4$ and $R^5$ are each alkyl radicals having from 1 to about 10 carbon atoms, and most preferably methyl radicals. There are two silicon bonded hydrogen atoms per molecule of (C), no silicon atom bearing more than one silicon bonded hydrogen atom. The value for "a" is a number in the range of from about 1 to about 500, preferably from about 20 to about 400, and most preferably from about 60 to about 250. The corresponding hydride equivalent weight of (C) is in the range of from 100 to about 18,500, preferably from about 800 to about 15,000, and most preferably from about 2200 to about 9300 grams/silicon-bonded hydrogen atom.

(C) is present in the composition of this invention in an amount sufficient to provide a silicon-bonded hydrogen content within the range of 0 to about 90, preferably from about 20 to about 80, and most preferably from about 50 to about 80, mole %, based on the total silicon-bonded hydrogen content of (C) and (D). It is within the scope of this invention that (C) is not present at all. It is only critical to the present invention that the hydride equivalent weight of the silicone hydride component, whether it be (C) and (D) or (D) alone, be at least 1500 grams/silicon-bonded hydrogen atom.

The viscosity of (C) is in the range of from about 10 to about 1000, preferably from about 20 to about 750, most preferably from about 100 to about 400, centipoise at 25° C. There are preferably about two silicon bonded hydrogen atoms per molecule of (C) and no silicon atom in (C) bears more than one silicon bonded hydrogen atom.

The term "compatible" means that the required amount of organohydrogenpolysiloxane (C) is at least partially soluble in the mixture of (A), (B) and (D) and will exist in a uniformly dispersed state in the composition of this invention while participating in the curing reaction, until the cure has been effected.

Organohydrogenpolysiloxanes and their preparation are well known in the organosilicon polymer art; some are commercially available. Briefly, the preparation of organohydrogensiloxanes can be accomplished in any suitable manner such as by hydrolyzing silanes, such as chlorosilanes, and equilibrating the resulting hydrolyzate under acid catalysis. Alternately, a mixture of suitable siloxanes, such as cyclic siloxanes and linear siloxanes, can be copolymerized and equilibrated under acid catalysis. For example, a hydride-stopped silicone fluid suitable for use in the present invention can be prepared by reacting tetramethyldisiloxane with cyclic methyl tetramer of predetermined ratio in the presence of Filtrol-20 as catalyst for 4-6 hours at 80°-100° C. The Filtrol-20 catalyst is then removed by filtration and the residual reactants are removed by vacuum stripping.

Component (D) is a hydrogen-containing polyorganosiloxane containing more than 2 silicon-bonded hydrogen atoms per chain and is selected from the group consisting essentially of (1) linear hydrogen-containing polydiorganosiloxane fluids having a viscosity of from about 5 to about 12,000, preferably from about 5 to about 5000, and most preferably from about 5 to about 2500, centipoise at 25° C., and a hydride equivalent weight of from about 60 to about 10,000, preferably from about 80 to about 2000, and most preferably from about 80 to about 200 grams/silicon-bonded hydrogen atom, and having the general formula

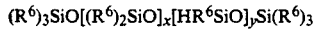

$(R^6)_3SiO[(R^6)_2SiO]_x[HR^6SiO]_ySi(R^6)_3$ wherein $R^6$ is an alkyl radical having from about 1 to about 10 carbon atoms or an aryl radical. "x" is a number in the range of from about 0 to about 800, preferably from about 20 to about 400, and most preferably from about 20 to about 200 and "y" is a number in the range of from about 3 to about 100, preferably from about 3 to about 30, and most preferably from about 3 to about 20; and (2) resinous hydrogen-containing siloxane copolymers selected from the group consisting essentially of:
  (a) resinous hydrogen-containing siloxane copolymers comprising by weight:
    (i) from about 60% to about 100% of $SiO_{4/2}$ units and $(R^7)_2HSiO_{1/2}$ units; wherein the ratio of $(R^7)_2HSiO_{1/2}$ units to $SiO_{4/2}$ units is from about 0.6:1 to about 2:1; and
    (ii) from 0 to about 40% of $(R^7)_3SiO_{1/2}$ units and $(R^7)_2SiO_{2/2}$ units; and
  (b) resinous hydrogen-containing siloxane copolymers comprising by weight:
    (i) from about 30% to about 100% of $R^7SiO_{3/2}$ units and $(R^7)_2HSiO_{1/2}$ units; wherein the ratio of $(R^7)_2HSiO_{1/2}$ units to $R^7SiO_{3/2}$ units is from about 0.6:1 to about 2:1; and
    (ii) from 0 to about 70% of $(R^7)_3SiO_{1/2}$ units and $(R^7)_2SiO_{2/2}$ units;

wherein $R^7$ is a monovalent hydrocarbon radical having from 1 to about 6 carbon atoms, at least 95% of all $R^7$ groups being an alkyl group. Examples of radicals represented by $R^7$ include alkyl radicals such as methyl, ethyl, and isopropyl; cycloaliphatic radicals such as cyclopentyl and cyclohexenyl; olefinic radicals, such as vinyl and allyl; and the phenyl radical. At least, 95% of all $R^7$ groups are alkyl groups, preferably methyl. The molar ratio of $(R^7)_2HSiO_{1/2}$ units to $SiO_{4/2}$ units is from about 0.6:1 to about 2:1.

(D) (1) has a viscosity of from about 5 to about 12,000, preferably from about 5 to about 5000, and most preferably from about 5 to about 2500, centipoise at 25° C.; and a hydride equivalent weight of from about 60 to about 10,000 and preferably from about 80 to about 2000 grams/silicon-bonded hydrogen atom.

The resinous siloxane copolymer (D) (2) has a hydride content of from about 0.05% to about 1.2% by weight and a hydride equivalent weight of from about 80 to about 2000 and preferably from about 80 to about 200 grams/silicon-bonded hydrogen atom.

The total of (B), (C) and (D) is from about 25 to about 50, preferably from about 30 to about 50, and most preferably from about 38 to about 45, parts by weight. The total of (A), (B), (C) and (D) is 100 parts by weight.

The ratio of silicon-bonded hydrogen atoms (i.e., "SiH") in (C) and (D) to olefinically unsaturated radicals (i.e., "SiVinyl") in the total of (A) and (B) being in the range of from about 1.1:1 to about 15.0:1, preferably from about 1.3:1 to about 4.0:1, and most preferably from about 1.3:1 to about 3.0:1. The amount of (C) and (D) sufficient to fulfill these ratio requirements is determined by measuring the alkenyl or vinyl contents of the desired types and amounts of components (A) and (B), which is typically done by Silicone-29 NMR. A precise amount of (C) and (D) can be used to provide a specific ratio of SiH to SiVinyl.

(C) and (D) have a combined average hydride equivalent weight of at least 1500, preferably from about 1500 to about 20,000, and most preferably from about 1500 to about 5000 grams/silicon-bonded hydrogen atom, based on the amount and hydride equivalent weight of (C) and (D). The combined average hydride equivalent weight of (C) and (D) is critical to the present invention. At combined average hydride equivalent weight levels of less than 1500 grams/silicon-bonded hydrogen atom, the peel and tack properties of the resulting pressure sensitive adhesive will also be low.

The hydrogen-containing polydiorganosiloxane (D) is present in the composition in an amount such that (D) provides a silicon-bonded hydrogen content of from about 10 to about 100 mole %, preferably from about 20 to about 80 mole %, based on the total silicon-bonded hydrogen content of (C) and (D).

In the compositions of this invention, (D) can be present at 100 mole %, i.e., no (C) is present, wherein 100% of the necessary hydride equivalent weight value is provided by (D) alone.

In the composition of this invention, (C) functions as chain extender, i.e., it causes the polymer chain of the composition to grow in a linear direction. (D) functions as a crosslinker. Without (D), the polymer chain does not undergo crosslinking. Crosslinking is necessary to the properties of the final pressure sensitive adhesive properties.

However, for practical reasons, it is preferred that (C) also be present in the composition. This is because it is easier to obtain the critical HEW value by balancing the HEWs of two hydride-containing silicone components than it would be by trying to prepare a hydride-containing component with the targeted HEW.

The linear hydrogen-containing polydiorganosiloxane fluid crosslinking agent of (D)(1) can be prepared by conventional methods analogous to the procedures for preparing the alkenyl-terminated polydiorganosiloxane (B) and the hydrogen-endstopped organopolysiloxane (C). For example, a mixture of organohydrogensilanes or organoalkenylsilanes or both, and optionally diorganosilanes, each having two hydrolyzable groups, can be cohydrolyzed with endstopping organosilanes having only one hydrolyzable group, including diorganohydrogensilanes and diorganoalkenylsilanes.

Examples of organosilanes having two hydrolyzable groups suitable for the crosslinking agent (D)(1) are methyldichlorosilane, phenyldichlorosilane, methylvinyldichlorosilane, and dimethyldichlorosilane. Examples of organosilanes having only one hydrolyzable group suitable for the crosslinking agent (D)(1) are dimethylchlorosilane, phenyldichlorosilane, dimethylvinylchlorosilane, and trimethylchlorosilane. Other organosilanes having one and two hydrolyzable groups can be used as can organosilanes having hydrolyzable groups other than the chloro group, such as, for example, bromo, acetoxy, and alkoxysilanes.

The resinous siloxanes of (D)(2)(a) are sometimes referred to herein as "$M^HQ$"-type resins, wherein "$M^H$" represents $(R^7)_2HSiO_{1/2}$ units and "Q" represents $SiO_{4/2}$ units. The resinous siloxanes of (D)(2)(b) are sometimes referred to herein as "$M^HT$"-type resins, wherein "$M^H$" represents $(R^7)_2HSiO_{1/2}$ units and "T" represents $R^7SiO_{3/2}$ units.

The "$M^HQ$"-type of resinous hydrogen-containing siloxane copolymers of (D)(2)(a) can be prepared by hydrolyzing a proper blend of dimethyl hydrogen chlorosilane and condensed ethyl silicate with water in a standard low acid resin hydrolysis facility and condition. The hydrolysis is controlled by time and reaction temperature. The resultant hydrolysate is collected and washed to remove residual acidity, then the mixture in toluene is refluxed to condense silanols. A final stripping step is then introduced to remove residual low molecular weight siloxanes, solvents at a temperature as high as 180° C. The final liquid resinous copolymer is characterized by $^{29}$Si-NMR.

The "$M^HT$" type of resinous hydrogen-containing siloxane copolymers of (D)(2)(b) can be prepared by hydrolyzing a proper blend of dimethyl hydrogen chlorosilane and methyltrichlorosilane with water in a standard low acid resin hydrolysis facility and condition. The hydrolysis is controlled by time and reaction temperature. The resultant hydrolyzate is collected and washed to remove residual acidity, then the mixture in toluene is refluxed to condense silanols. A final stripping step is then introduced to remove residual low molecular weight siloxanes, solvents at a temperature as high as 150° C. The final liquid resinous copolymer is characterized by $^{29}$Si-NMR.

Component (E) of the composition of the present invention is a catalyst which promotes the hydrosilation reaction. Useful catalysts for facilitating the hydrosilation curing reaction include precious metal catalysts such as those which use ruthenium, rhodium, palladium, osmium, iridium, and platinum, and complexes of these metals. Examples of suitable hydrosilation catalysts for use in the present invention are disclosed, for example, in U.S. Pat. Nos. 3,159,601 and 3,159,662 (Ashby); 3,220,970 (Lamoreaux); 3,814,730 (Karstedt); 3,516,946 (Modic), and 4,029,629 (Jeram); all of the foregoing patents being hereby incorporated by reference herein.

Preferably, the hydrosilation catalyst used in the present invention is a platinum-containing catalyst. Suitable platinum-containing hydrosilation catalyst include any of the well known forms of platinum that are effective for catalyzing the reaction of silicon-bonded hydrogen atoms with silicon-bonded vinyl groups, such as finely divided metallic platinum, platinum on a finely divided carrier such as alumina, compounds of platinum such as chloroplatinic acid and complexes of platinum compounds.

Other suitable plantinum-containing hydrosilation catalysts for use in the present invention include the platinum hydrocarbon complexes described in U.S. Pat. Nos. 3,159,601 and 3,159,662 to Ashby, and the platinum alcoholate catalysts described in U.S. Pat. No. 3,220,970 to Lamoreaux, as well as the platinum catalysts of U.S. Pat. No. 3,814,730 to Karstedt. Additionally, the platinum chloride-olefin complexes described in U.S. Pat. No. 3,516,946 to Modic are also useful herein. All of the aforesaid catalysts are thermally activated. Also useful are the photoactive platinum catalysts such as those of U.S. Pat. No. 4,510,094 to Drahnak. All of the U.S. Patents cited in the instant paragraph are incorporated by reference into the present disclosure.

Catalysts which are soluble in the mixture of (A), (B) and (C) are preferred, particularly if optical clarity is desired.

The hydrosilation catalyst (E) is present in the composition of this invention in an amount sufficient to provide at least 0.1 part by weight platinum for one million parts by weight of the combined weight of (A), (B), (C) and (D). Frequently, such small amounts of catalyst are poisoned by trace amounts of impurities in the composition so it is advantageous to use the platinum catalyst in such quantities to provide at least 1.0 part per million (ppm). The amount of platinum-containing catalyst is not critical with respect to the upper limit but its cost would suggest that excessive quantities be avoided. Amounts of up to 200 ppm platinum are not unusual but preferably from 1 to 35 parts by weight of platinum for every one million parts by weight of the total of (A), (B), (C) and (D) used.

The compositions of the present invention comprise 0 to about 40, preferably from about 0 to about 20, and most preferably 0, percent by weight of an organic solvent. Suitable organic solvents include any of the solvents conventionally used with organosiloxanes and having a boiling point below approximately 250° C., such as aromatic hydrocarbons, e.g., benzene, toluene, and xylene; aliphatic hydrocarbons such as hexane, heptane, and cyclohexane; halogenated hydrocarbon solvents such as trichloroethane and chloroform; naphthas such as petroleum ether, VM and P Naphtha and refined naphthas such as Naphthalite 66/3 and oxygenated solvents such as hydrocarbon ethers, e.g., tetrahydrofuran and the dimethylether of ethylene glycol: ketones such as methyl isobutyl ketone and esters such as ethyl acetate and the like. Mixtures of organic solvents can also be used.

The components of the compositions of this invention can be mixed in any manner such as in bulk or in organic solvent. Since the resinous copolymer (A) is a solid and is conveniently prepared and handled in an organic solvent, the preparation of the composition of this invention preferably uses an organic solvent, at least for the mixing of (A) and (B). The organic solvent can be any of the solvents recited above in connection with component (E). The mixing of the components can be accomplished by any of the techniques known in the art, such as milling, blending, stirring, and the like, either in batch or in continuous process.

The curing of the composition of the present invention proceeds by the addition reaction of the silicon-bonded hydrogen atoms in (C) and (D) with the alkenyl groups in (B) under the catalytic activity of (E). Stability, and consequently greater peel adhesion and tack properties, is provided to the cured pressure sensitive adhesive composition by the hydride equivalent weight (HEW) of (C) as well as the average HEW of (C) and (D), which is determined by the amounts and HEW values of both (C) and (D).

The composition of this invention can be prepared, with or without the aid of solvent, by simply mixing (A), (B), (C), (D), and (E) together in the stated proportions. The order of mixing of the components is not critical, except that (C), (D), and (E) are preferably brought together last. This is referred to herein as a one-component system. However, the best method of preparing the composition of this invention is based on a two-component system, wherein two blends are used, one comprising the resinous copolymer (A), which may be dissolved in about an equal weight of an organic solvent to facilitate mixing, with polydiorganosiloxane (B) and the other blend comprising the resinous copolymer, which also may be dissolved in about an equal weight of an organic solvent to facilitate mixing, with polydiorganosiloxane (C) and (D), so as to form premade intermediates. This method is preferred because it facilitates control of the SiH/SiVinyl ratio. To obtain compositions having at least 90% and preferably about 95% solids, the copolymer/polydiorganosiloxane blends should be devolatilized under conditions equivalent to heating for 1 hour at 150° C. at atmospheric pressure in order to obtain optimum pressure sensitive adhesive properties. Obviously, excessively high temperatures should be avoided when components (A) and (B) or their mixtures are being devolatilized. A temperature of 100° C., and preferably 80° C., should not be exceeded. The mixture of (A), (B) and solvent is devolatilized in thin film at a temperature of no more than 70° C. at full vacuum. Additional solvent may be added to the cooled, devolatilized mixtures to obtain a desired viscosity. Catalyst (E) is added to the devolatilized mixture of (A) and (B) to complete the composition of the first component of the two-component system. The second mixture is prepared by blending (A) and (C) and then devolatilizing the blend under vacuum at a temperature of no more than 70° C. at full vacuum. Depending on its volatility, (D) can be added to the mixture of (A) and (C), either before or after the mixture has been devolatilized. A small amount of addition-cure inhibitor and additional solvent may also be added to the cooled, devolatilized mixture of (A), (C) and (D) to obtain a desired viscosity. The final composition is completed by mixing the two components in appropriate amounts.

Thus, in a preferred embodiment of the composition of the present invention, the composition comprises by weight:

(1) a solventless mixture comprising by weight from about 55 to about 62 parts by weight of (A) and from about 38 to about 45 parts by weight of (B);

(2) a solventless mixture comprising by weight from about 55 to about 62 parts by weight of (A) and from about 38 to about 45 parts by weight of (C) and (D); and (3) a hydrosilation catalyst.

Small amounts of additional ingredients may be added to the composition of this invention if desired. For example, antioxidants, pigments, stabilizers, fillers, and the like, may be added as long as they do not materially reduce the pressure sensitive adhesive properties of these compositions. Volatile additives are preferably added after any solvent removal operations have been completed.

When components (A), (B), (C), (D), and (E) are mixed, the composition begins to cure at a rate which is directly proportional to the temperature of the composition. The composition of this invention can be cured at room temperature or cured by heating. When heat curing is used, a temperature of about 80° C. to 200° C. can be used. However, the composition of this invention will cure at low temperatures, i.e., from 105° C. to 125° C., at 5 minutes or less to produce pressure sensitive adhesives having high peel adhesion and high tack. The exceptional pressure sensitive adhesive characteristics of these compositions are developed when the composition is cured and the cured composition is essentially free of organic solvent.

Preferably, the uncured composition of this invention should be used within a few hours after being prepared, although this time interval from preparation to use, otherwise known as "shelf life", can be extended to several days by cooling the mixture to a temperature of −20° C. or below. Equally long or longer "shelf life" can be realized by mixing a platinum catalyst inhibitor in the second component if a two-component system is used or with the curable mixture.

Platinum catalyst inhibitors which are useful in the composition of this invention and which display varying lengths of cure time inhibition in our compositions are those described in U.S. Pat. Nos. 3,188,299; 3,188,300; 3,192,181; 3,344,111; 3,383,356; 3,445,420; 3,453,233; 3,453,234; and 3,532,649, and others which might be known in the art. All of the patents cited in the instant paragraph are incorporated by reference herein. Concrete examples of inhibitors which can be used in the composition of the present invention include the ene-ynes, such as 3-methyl-3-pentene-1-yne and 3,5-dimethyl-3-hexene-1-yne; the alkynyl alcohols, such as 3-methyl-1-butyne-3-ol; 3,5-dimethyl-1-hexyne-3-ol; 3-methyl-1-pentyne-3-ol; and phenylbutynol; the unsaturated ester, such as alkyl and substituted alkyl maleates; and polymethylvinylcyclosiloxanes. The preferred inhibitors for use in this invention are the dialkylmaleates and most preferably dimethylmaleate.

The effectiveness of a platinum catalyst inhibitor depends on many factors such as its chemical composition, its physical properties, its concentration, and the like. For the purposes of this invention, an effective amount of any particular platinum catalyst inhibitor can be determined by routine experimentation. Since many platinum catalyst inhibitors are relatively volatile it is preferable to add them to the compositions of this invention after any heating and/or vacuum operations of the preparative process have been completed. For maximum effectiveness, however, a platinum catalyst inhibitor should be added to the composition of this invention at least simultaneously with, and preferably prior to the mixing of components (C) and (D) or parts containing them.

The compositions of this invention, when containing a platinum catalyst inhibitor, can be cured by removing the inhibitor, for example, by evaporation at room temperature or higher. Curing can also be accomplished in most cases by heating the composition to a temperature of from 80° C. to 200° C., preferably from 105° C. to 125° C.

The uncured composition of this invention can be used as a solution in one or more of the organic solvents described above or the composition can be used with no solvent present. While it is possible to use as much as 40 percent of an organic solvent based on the total weight of the composition, the presence of solvent is not required. If the presence of solvent is desired, this can be accomplished simply by not removing all of the solvent that is used in the preparation of the composition. Alternately, all of the solvent that is used in the preparation of the composition can be removed and the desired amount of the same or another solvent can be added. It will be obvious to those skilled in the art that in the case where the solvent that is used to aid in the application of the composition of this invention has a higher boiling point than the solvent used in their preparation, the necessary solvent change can be accomplished in two steps as described above or in a one step process wherein the higher boiling point solvent is present in the mixture during the removal of the lower boiling solvent. If, during the preparation of the composition of this invention, any portion of the solvent is removed, particularly if heat and/or vacuum is used to remove the solvent, it is preferred to remove the solvent prior to the addition of other volatile components such as inhibitors or additives. The removal of solvent can be accomplished by any of the known techniques such as entrainment in a stream of inert gas, evaporation, distillation, thin film stripping, and the like, and at any combination of temperature and pressure where the temperature is not allowed to exceed approximately 120° C., preferably about 80° C.

The compositions of this invention are useful as pressure sensitive adhesives and will readily stick to a solid support, whether flexible or rigid. The composition is simply applied to the surface of the support by any suitable coating means such as rolling, spreading, spraying, and the like; and cured as described above. It should be understood that the use of the compositions of this invention encompasses not only the application of the completed, uncured composition on the surface. For example, it is within the scope of this invention to apply a layer of a mixture of (a), (b), (c) and (d) to a solid support and then add the platinum catalyst (e), the needed mixing being accomplished by diffusion of (e) into the layer of (a), (b), (c), and (d). It is preferred to delay the curing reaction until (e) is thoroughly diffused into the layer on the support. Any solvent that is present in the cured composition is preferably allowed to evaporate before the surface bearing the composition is adhered to a substrate, although this is not necessary.

The surface of the support and the substrate to which the support is adhered may be any known solid material such as metals, e.g., aluminum, silver, copper, iron, and their alloys; porous materials such as paper, wood, leather, and fabrics; organic polymeric materials such as polyolefins, e.g., polyethylene and polypropylene; fluorocarbon polymers such as polytetrafluoroethylene and polyvinylfluoride, silicone elastomers, silicone resins, polystyrene; polyamides, Nylon ® polyimides, polyesters, and acrylic polymers; painted surfaces; siliceous materials such as concrete, bricks, cinderblocks, and glass, e.g., glass cloth and the like. Porous materials such as glass cloth are often impregnated with a substance that will prevent the migration of the PSA from one surface to another surface of the support. It is also well known to chemically treat the surface of a fluorocarbon polymer support to enhance the adhesion of a PSA to said surface.

Solid supports bearing the cured compositions of this invention are reliably adhered to any solid substrate because the compositions possess the desirable combination of high tack and good adhesive strength.

Useful articles which can be prepared with the PSAs of this invention include pressure sensitive adhesive tapes, labels, emblems, and other decorative or informative signs, and the like. An especially useful article is one comprising a support, flexible or rigid, that can withstand extreme temperatures, hot and/or cold, and carrying on at least one surface thereof, the polyorganosiloxane PSAs of this invention. Such an article makes full use of the stability at high temperatures and the flexibility at low temperatures that the PSAs of this invention possess.

A preferred article is a pressure sensitive adhesive tape comprising an impregnated glass cloth, a polyester polymer, a polyimide polymer, or a chemically treated fluorocarbon polymer support carrying on at least one surface thereof the cured compositions of this invention.

In order that those skilled in the art may better understand the present invention, the following examples are given to illustrate but not to limit the invention which is fully delineated by the appended claims.

EXPERIMENTAL

In the examples below, the term "MQ resin" refers to a 60% by weight solution in toluene of a silicone resin containing $(CH_3)_3SiO_{\frac{1}{2}}$ ("M") units, and $SiO_{4/2}$ ("Q") units and having a silanol content of about 1 to 3% by weight.

In the examples below, the term "D" refers to the repeating units in the polymers in question.

The linear hydride silicone crosslinker fluid used in the following examples has the formula

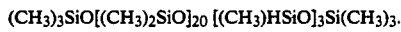

The formula above is hereinafter represented by the designation $MD_{20}D_3^HM$, wherein M represents $(CH_3)_3SiO_{\frac{1}{2}}$; $D_{20}$ represents $[(CH_3)_2SiO]_{20}$, and $D^H_3$ represents $[(CH_3)HSiO]_3$. The linear hydride silicone crosslinker fluid above has an HEW of 625.

To uniformly present the adhesive properties of cured compositions, all compositions prepared in the examples below were applied and cured on 0.001 inch (i.e., 1 mil) untreated polyethylene terephthalate (PET) film substrates. It is to be understood that the adhesion values are directly proportional to the thickness of the substrate, i.e., the thicker the substrate, the higher the adhesion values.

The peel adhesion of the pressure sensitive adhesive was determined using a Scott Tester, using 180° pull at a rate of 12 inches/minute against a stainless steel plate. Tack was measured by means of a Polyken Probe Tack Tester, manufactured by Testing Machines incorporated, which was fitted with a probe having a diameter of 0.5 centimeter and operated at a rate of 1 cm/sec and a dwell time of 1 second.

EXAMPLE 1

Crosslinker-free Composition

Example 1 illustrates the preparation of a pressure sensitive adhesive composition prepared in the absence of a crosslinker.

Component A is a pre-made intermediate composition containing 58% by weight of a silicone MQ resin and 42% by weight of a low viscosity, vinyl-terminated polydimethylsiloxane having a viscosity of about 215 centipoise at 25° C., a degree of polymerization of about 120 (or 4524 grams/equivalent vinyl), and a vinyl content of 0.597% by weight, according to $^{29}$Si-NMR.

Component B is a pre-made solventless mixture containing 58% by weight of a silicone MQ resin and 42% by weight of a hydrogen-stopped polydimethylsiloxane having a hydride content of about 0.0207% by weight, a degree of polymerization of 128.4 (i.e., an HEW of 4831), and a viscosity of 208 centipoise at 25° C.

The platinum catalyst used is a 5.0% by weight platinum complex catalyst stabilized in a solution of excess tetramethyldivinyldisiloxane.

A mixture was prepared by mixing 5.71 grams of component A, 6.2 grams of component B, 2 drops of dimethyl maleate inhibitor, 50 ppm of platinum catalyst, and about 0.6 grams of toluene solvent. The SiH:SiVinyl ratio in the mixture was 1.01:1.

With a bar coater, the mixture was applied over a 1 mil thick polyethylene terephthalate (PET) film and cured at 150° C. for 3 minutes to yield a cured film having a thickness of about 1.6 mil.

The Polyken probe tack adhesion was 340 grams and the 180 degree peel adhesion against a steel plate was 14 oz/inch. Residues were present on both the steel plate and the Probe Tack copper button, which felt gummy. The presence of the gummy residues indicated that the silicone film did not cure well and did not have acceptable properties. Although this example had a HEW of 4831, it was shown to have unacceptable properties due to lack of hydride crosslinker fluid.

EXAMPLES 2 AND 3

In Examples 2 and 3, the procedure followed in Example 1 was repeated except that 0.084 grams of the hydrogen fluid crosslinker was added in Example 2 (yielding a 20 mole % content of crosslinker and an averaged HEW of 3990) and 0.144 grams of the hydrogen fluid crosslinker (yielding a 30 mole % content of crosslinker and an averaged HEW of 3570) was added in Example 3. The probe tack and peel adhesion of the cured sample of Example 2 was 920 grams and 38 oz/inch, respectively. The probe tack and peel adhesion of the cured sample of Example 3 was 778 grams and 38 oz/inch, respectively.

Both samples cured well, leaving no residues. The results for Examples 2 and 3 illustrate the dramatic cure response and significant improvement in adhesive properties in both tackiness and peel adhesion, which are obtained with the use of the hydrogensiloxane fluid crosslinker to achieve desired HEW levels. The results for Examples 2 and 3 further show that excellent pressure sensitive adhesion properties are obtained at hydride equivalent weight of 3500 to 4000 grams/silicon-bonded hydrogen atom(or at 20 to 30 mole % level of hydride crosslinker). These examples further show that excellent tack and peel adhesion properties are obtained at total SiH/SiVinyl ratios of 1.27 and 1.45, respectively.

EXAMPLE 4

Example 4 illustrates the effect on tack and peel adhesion which results from using a hydride-stopped silicone fluid of 68 D units of a hydride equivalent weight (HEW) of 2588 grams/silicon-bonded hydrogen atom in Component B rather than a hydride-stopped silicone fluid of 128 D units. This hydride-stopped fluid exhibited a viscosity of 72 centipoise at 25° C. The composition prepared in Example 4 was otherwise identical to that prepared in Example 3.

The composition was coated onto a 1 mil polyethylene terephthalate film and cured as in Examples 1–3. The tack obtained for the cured film was 710 grams and the peel adhesion was 30 oz/inch. Although the tack and peel adhesion properties for the cured film in Example 4 was slightly less than those obtained in Example 3, they were still good. This example further illustrates the properties of compositions having an averaged HEW of about 2000 in comparison to those in the 3500 to 4000 range. This example further supports the findings in the last examples, namely, that good properties are obtained at a SiH/SiVinyl ratio of 1.40:1.

EXAMPLE 5

Example 5 illustrates the effect of the structure of the crosslinking agent on the quality of cure and the properties of the cured PSA film. In Example 5, the procedure of Example 2 was repeated except that a hydride-containing siloxane resin contained $(CH_3)_2SiO_{2/2}$ units, $(CH_3)_3SiO_{\frac{1}{2}}$ units, and $SiO_{4/2}$ units and having a hydride equivalent weight of 111 grams/silicon-bonded hydrogen atom or a hydrogen content of 0.90% was used in place of the hydrogen siloxane fluid crosslinker. The final composition had an averaged HEW of 3887 grams/silicon-bonded hydrogen atom. The tack of the cured film was 694 grams and the peel adhesion was 35 oz/inch. The composition cured well and left no residues.

The composition of Example 5 cured faster than the composition without crosslinker (Example 1). Furthermore, the cured PSA film of Example 5 had an excellent peel adhesion and lower but still acceptable tack than the cured PSA film prepared using hydrogen siloxane fluid crosslinker (Examples 2–3) and an HEW value in the 3500 to 4000 grams/silicon-bonded hydrogen atom range.

Examples 2–5 indicate that a more compliable and elastic type of cured PSA film is obtained with the use of a linear hydrogen siloxane crosslinker and a higher HEW.

EXAMPLE 6

Example 6 illustrates the effect on tack and peel adhesion properties resulting from the use in component B of a hydride-stopped silicone fluid having 68 D units (HEW of 2588) rather than 128 D units (HEW of 4831). The procedure of Example 5 was otherwise repeated. The final composition yielded an averaged HEW of 2092. The tack obtained for the cured PSA film was 722 grams and the peel adhesion was 28 oz/inch. The composition of Example 6 curred well, leaving no residues.

Data regarding total hydride/vinyl ratio, mole % of crosslinker, averaged hydride equivalent weight (expressed as {HEW}), hydride chain length (expressed in terms of D units), and MQ resin level, is summarized in Table 1 and the probe tack, peel adhesion, and cure quality of the cured PSA films are presented in Table 2 below. The vinyl chain length in each example was 120.

TABLE 1

Examples 1-Formulations

| Example No. | Cross-linker (HEW) | Total Hydride/ Vinyl Ratio | Cross-linker (mol %) | {HEW} | Hydride Chain Length (D) | MQ Resin Level |
|---|---|---|---|---|---|---|
| 1 | None | 1.01 | 0 | None | 128.00 | 58.00 |
| 2 | Hydride Fluid (625) | 1.27 | 20.00 | 3990 | 128.00 | 58.00 |
| 3 | Hydride Fluid (625) | 1.45 | 30.00 | 3570 | 128.00 | 58.00 |
| 4 | Hydride Fluid (625) | 1.40 | 30.00 | 2000 | 68.00 | 58.00 |
| 5 | $M^HQ$ (111) | 1.27 | 20.00 | 3887 | 128.00 | 58.00 |
| 6 | $M^HQ$ (111) | 1.27 | 20.00 | 2092 | 68.00 | 58.00 |

TABLE 2

Examples 1-6: Properties

| Example No. | Tack (grams/cm$^2$) | Peel Adhesion (ounces/inch) | Quality of Cure |
|---|---|---|---|
| 1 | 340 | 14 | Residues |
| 2 | 920 | 38 | Cured Well |
| 3 | 778 | 38 | Cured Well |
| 4 | 710 | 30 | Cured Well |
| 5 | 694 | 35 | Cured Well |
| 6 | 722 | 28 | Cured Well |

The data shown in Table 2 indicates that without the crosslinker (Example 1), the composition has low peel adhesion and poor cure quality. With crosslinker, the composition had high peel adhesion and good cure quality in addition to high tack.

EXAMPLE 7

Crosslinker-Free

The procedure followed in Example 1 was repeated except that the amount of Component B was 7.74 grams rather than 6.2 grams. The resulting mixture had a terminal hydrogen to terminal vinyl ratio of 1.27:1 and contained no hydride crosslinker. A 1.5 mil thick film of the composition was coated onto 3 different 1.0 mil thick polyethylene terephthalate substrate and cured. The 3 films were cured at 105° C. for 5 minutes, 125° C. for 3 minutes, and 150° C. for 3 minutes, respectively. Residues were found during tack testing. Peel testing showed cohesive failure for all 3 coated substrates. The film cured at 150° C. for 3 minutes had a tack of 482 grams and a peel adhesion of 33 ounces/inch. Example 7 illustrates the need for a hydride crosslinking fluid in order to obtain residue-free adhesive tapes.

EXAMPLE 8

A composition identical to that prepared in Example 1 was prepared in Example 8 except that 0.0372 grams of hydrogen siloxane fluid crosslinker having an HEW of 625 was added to the composition of Example 8. In the composition of Example 8, the crosslinking hydride constituted 10% of the total reactive silicon-bonded hydrogen atoms in the composition or had an averaged HEW of 4410. The curing procedure described in Example 7 was repeated, wherein a 1.5 mil thick film of the composition was coated onto 3 different 1.0 mil thick polyethylene terephthalate substrate and cured at 105° C. for 5 minutes, 125° C. for 3 minutes, and 150° C. for 3 minutes, respectively.

Cure was not complete at 105° C. in a cure time of 5 minutes. Good cure response was obtained at 125° C. in a cure time of 3 minutes and at 150° C. in a cure time of 3 minutes. The cure quality of the film cured in Example 8 was superior to that of the film cured in Examples 1 and 7, thus indicating the need for the crosslinker in order to obtain good cure quality.

The tack and peel adhesion of the film cured at 125° C. for 3 minutes of Example 8 was 778 grams and 37 ounces/inch, respectively.

EXAMPLE 9

Example 8 was repeated except that a vinyl-terminated fluid of 105 D units was used as the vinyl polymer in Part A and a hydride-terminated fluid of 121 D units (i.e., HEW of 4560) was used as the hydride fluid in Part B. Furthermore, the crosslinking hydride in Example 8 constituted 20 mole % of the total reactive silicon-bonded hydrogen atoms in the composition. The final composition had an average HEW of 3796. A 1.8 mil thick film of the composition was coated onto 3 different 1.0 mil thick polyester substrates and cured at 105° C. for 5 minutes, 125° C. for 3 minutes, and 150° C. for 3 minutes, respectively. All three coated films cured to form residue-free films.

The tack and peel adhesion of the film cured at 150° C. for 3 minutes of Example 9 was 786 grams and 41 ounces/inch, respectively.

The composition prepared in Example 9 exhibited the fastest cure rate and showed the best cure results under all three cure conditions. The cured composition had excellent properties.

In comparison to Example 7 which used the same SiH/SiVinyl ratio, Example 9 illustrates the benefit of using a hydride crosslinker to speed up the cure of the PSA composition Data regarding hydride/vinyl ratio, mole % of crosslinker, total SiH/SiVinyl vinyl ratio, and cure conditions in Examples 8 and 9 is summarized in Table 3 and the probe tack, peel adhesion, and cure quality of the cured PSA films are presented in Table 4 below.

present invention, was not present. The specific values pertaining to these characteristics are summarized in Table 5 below. Examples 20, 21, and 22 below are identical to the compositions prepared in Examples 3, 9, and 2, respectively. In Table 5 below, the term "SiH:SiVi"

TABLE 3

Examples 8 and 9: Formulations

| Example No. | Crosslinker (HEW) | Crosslinker (mol %) | {HEW} | Total SiH/SiVinyl vinyl ratio | 105° C. 5 min. | 125° C. 3 min. | 150° C. 3 min. |
|---|---|---|---|---|---|---|---|
| 8 | Hydride Fluid (625) | 10.00 | 4410 | 1.12 | Residues | Cured Well | Cured Well |
| 9 | Hydride Fluid (625) | 20.00 | 3796 | 1.22 | Cured Well | Cured Well | Cured Well |

TABLE 4

Examples 8 and 9: Properties

| Example No. | Tack (grams/cm$^2$) | Peel Adhesion (ounces/inch) |
|---|---|---|
| 8 | 778 | 37 |
| 9 | 786 | 41 | refers to the SiH:SiVinyl ratio described previously herein. The term "SiH HEW" refers to the hydride equivalent weight of the hydride silicone fluid, i.e., component (C) of the present invention. The term "Crosslinker HEW" refers to the hydride equivalent weight of the hydride crosslinker, i.e., component (D) of the present invention.

TABLE 5

| Example No. | Cross-linker Type | {HEW} | Viscosity of Crosslinker and SiH fluid (cps) | Crosslinker HEW | SiH Fluid HEW | Mole % Crosslinker |
|---|---|---|---|---|---|---|
| 10 | D$_4$H (SiH/SiVi = 1.42) | 60.1 | 5 | 60.1 | None | 100 |
| 11 | MD$^H_{92}$M (SiH/SiVi = 1.42) | 61.8 | 30 | 61.8 | None | 100 |
| 12 | MD$_{20}$D$_3^H$M (SiH/SiVi = 1.42) | 625 | 23 | 625 | None | 100 |
| 13 | MD$_{363}$D$_{18}^H$M (SiH/SiVi = 1.40:1) | 1562 | 2320 | 1562 | None | 100 |
| 14 | MD$_{20}$D$_3^H$M (SiH/SiVi = 1.42:1) | 1000 | 27 | 625 | 4831 | 91.1 |
| 15 | MD$_{20}$D$_3^H$M (SiH/SiVi = 1.42:1) | 1000 | 27 | 625 | 2588 | 80.9 |
| 16 | MD$_{20}$D$_3^H$M (SiH/SiVi = 1.42:1) | 1200 | 30 | 625 | 2588 | 70.7 |
| 17 | MD$_{20}$D$_3^H$M (SiH/SiVi = 1.42:1) | 1300 | 32 | 625 | 2588 | 65.6 |
| 18 | MD$_{20}$D$_3^H$M (SiH/SiVi = 1.42:1) | 1500 | 37 | 625 | 2588 | 55.4 |
| 19 | MD$_{20}$D$_3^H$M (SiH/SiVi = 1.42:1) | 2000 | 49 | 625 | 2588 | 30 |
| 20 | MD$_{20}$D$_3^H$M (SiH/SiVi = 1.42:1) | 3570 | 114 | 625 | 4831 | 30 |
| 21 | MD$_{20}$D$_3^H$M (SiH/SiVi = 1.42:1) | 3796 | 125-130 | 625 | 4560 | 20 |
| 22 | MD$_{20}$D$_3^H$M (SiH/SiVi = 1.42:1) | 3990 | 136 | 625 | 4831 | 20 |
| 23 | MD$_{363}$D$_{18}^H$M (SiH/SiVi = 1.42:1) | 2000 | 615 | 1562 | 2588 | 57.3 |
| 24 | MD$_{363}$D$_{18}^H$M (SiH/SiVi = 1.42:1) | 4500 | 270 | 1562 | 4831 | 10.1 |
| 25 | M$^H_{1.8}$D$_{0.2}$Q (SiH/SiVi = 1.27:1) | 2092 | 64 | 111 | 2588 | 20 |
| 26 | M$^H_{1.8}$D$_{0.2}$Q (SiH/SiVi = 1.27:1) | 3887 | 150 | 111 | 4831 | 20 |

EXAMPLES 10-26

In Examples 10-26, compositions were prepared identical to that prepared in Example 1 except for component B and the presence of a crosslinker in Examples 10-26. The compositions prepared in Examples 10-26 differed from one another on the basis of crosslinker type, crosslinker average HEW, crosslinker and silicone hydride viscosity, silicone fluid HEW, and mole % crosslinker. In Examples 10-13, a hydride-stopped silicone fluid, i.e., component (C) of the composition of the The compositions prepared in Examples were cured at about 150° C. for about 3 minutes. The thickness of the PSA coating on the substrate, the peel and tack properties, and comments on the cure quality of the cured PSAs in Examples 10-26 are presented in Table 6 below.

TABLE 6

Examples 10–26: Properties

| Example No. | Thickness (mils) | Peel (oz/in) | Tack (grams) | Cure Quality |
|---|---|---|---|---|
| 10 | 2.6 | 10 | 300 | Residues |
| 11 | 2.2 | 16 | 52 | Good, No Residues |
| 12 | 1.6 | 13 | 200 | Good, No Residues |
| 13 | 2.1 | 23 | 456 | Good, No Residues |
| 14 | 1.4 | 15 | 412 | Good, No Residues |
| 15 | 1.4 | 14 | 326 | Good, No Residues |
| 16 | 1.6 | 19 | 510 | Good, No Residues |
| 17 | 1.5 | 20 | 532 | Good, No Residues |
| 18 | 1.5 | 22 | 574 | Good, No Residues |
| 19 | 1.5 | 30 | 710 | Good, No Residues |
| 20 | 1.8 | 38 | 778 | Good, No Residues |
| 21 | 1.8 | 41 | 786 | Good, No Residues |
| 22 | 1.8 | 38 | 920 | Good, No Residues |
| 23 | 1.9 | 25 | 416 | Good, No Residues |
| 24 | 2.5 | 41 | 525 | Good, No Residues |
| 25 | 1.6 | 28 | 722 | Good, No Residues |
| 26 | 1.7 | 35 | 694 | Good, No Residues |

Examples 10–26 above illustrate the connection between the hydride equivalent weight of the crosslinker (D) alone or the combined hydride equivalent weight of the crosslinker (D) and the silicone hydride fluid (C) and good pressure sensitive adhesive properties. Examples 13 and 18 illustrate that if the hydride equivalent weight of the hydride-containing silicone crosslinker is 1500 grams/silicon-bonded hydrogen atom or above, good pressure sensitive properties can be achieved in the absence of the silicone hydride fluid (C). Good pressure sensitive adhesive properties are obtained as long as the pressure sensitive adhesive composition has a hydride equivalent weight of 1500 grams/silicon-bonded hydrogen atom or above. Such a hydride equivalent weight can be obtained by the average hydride equivalent weight of combined (C) and (D) or by the hydride equivalent weight of (D) alone.

What is claimed is:

1. An organopolysiloxane composition curable to produce a pressure sensitive adhesive having high tack and high peel adhesion, comprising by weight:

(A) from about 50 to about 75 parts by weight of a toluene soluble, resinous copolymer comprising $R_3SiO_{\frac{1}{2}}$ units and $SiO_{4/2}$ units wherein R is selected from the group consisting of alkyl groups and alkenyl groups, wherein the resinous copolymer comprises from about 0.2% to about 5.0% by weight, based on the total weight of the copolymer, of hydroxyl radicals, at least 95% of all R groups being an alkyl group, the total number of R radicals that are alkenyl radicals being 0–0.5% of all R radicals, the molar ratio of $R_3SiO_{\frac{1}{2}}$ units to $SiO_{4/2}$ units being from about 0.6 to about 0.9 inclusive;

(B) an alkenyl-terminated polydiorganosiloxane having a viscosity of from about 20 to about 400 centipoise at 25° C. and having the general formula $$R^2R^1{}_2SiO(R^3{}_2SiO)_mSiR^1{}_2R^2 \qquad (I)$$

wherein each $R^1$ is independently an alkyl group having from 1 to about 10 carbon atoms or an aryl group, $R^2$ is an alkenyl group having from 1 to about 10 carbon atoms, each $R^3$ is independently $R^1$ or $R^2$, with the proviso that at least 99.5% of all $R^3$ radicals are $R^1$, "m" is a number in the range of from about 1 to about 300;

(C) a hydride-terminated organohydrogenpolysiloxane in an amount sufficient to provide a silicon-bonded hydrogen content of from 0 to about 90 mole % based on the total silicon-bonded hydrogen content of (C) and (D), wherein (C) is compatible with the mixture of (A) and (B), has a viscosity of from about 10 to about 1000 centipoise at 25° C., and has the general formula $$R^4{}_2HSiO(R^5{}_2SiO)_aSiHR^4{}_2 \qquad (II)$$

wherein each $R^4$ is independently an alkyl group having from 1 to about 10 carbon atoms or an aryl group, and each $R^5$ is hydrogen or $R^4$, with the proviso that at least 99.5% of all $R^5$ radicals are $R^4$, "a" is a number in the range of from 1 to about 500, there being at least two silicon bonded hydrogen atoms per molecule of (C), no silicon atom bearing more than one silicon bonded hydrogen atom;

(D) a hydrogen-containing polydiorganosiloxane containing more than 2 silicon-bonded hydrogen atoms per chain and present in an amount sufficient to provide a silicon-bonded hydrogen content of from 10 to about 100 mole % based on the total silicon-bonded hydrogen content of (C) and (D), wherein (D) is selected from the group consisting essentially of (1) linear hydrogen-containing polydiorganosiloxane fluids having a viscosity of from about 5 to about 12,000 centipoise at 25° C., a hydride equivalent weight of from about 60 to about 10,000 grams/silicon-bonded hydrogen atom, and the general formula $$(R^6)_3SiO[(R^6)_2SiO]_x[HR^6SiO]_ySi(R^6)_3$$

wherein $R^6$ is an alkyl radical having from about 1 to about 10 carbon atoms or an aryl radical, "x" is a number in the range of from about 0 to about 800, and "y" is a number in the range of from about 3 to about 100; and (2) resinous hydrogen-containing siloxane copolymers selected from the group consisting essentially of:

(a) resinous hydrogen-containing siloxane copolymers comprising by weight:

(i) from about 60% to about 100% of $SiO_{4/2}$ units and $(R^7)_2HSiO_{\frac{1}{2}}$ units; wherein the ratio of $(R^7)_2HSiO_{\frac{1}{2}}$ units to $SiO_{4/2}$ units is from about 0.6:1 to about 2:1; and (ii) from 0 to about 40% of $(R^7)_3SiO_{\frac{1}{2}}$ units and $(R^7)_2SiO_{2/2}$ units; and (b) resinous hydrogen-containing siloxane copolymers comprising by weight:

(i) from about 30% to about 100% of $R^7SiO_{3/2}$ units and $(R^7)_2HSiO_{\frac{1}{2}}$ units; wherein the ratio of $(R^7)_2HSiO_{\frac{1}{2}}$ units to $R^7SiO_{3/2}$ units is from about 0.6:1 to about 2:1; and (ii) from 0 to about 70% of $(R^7)_3SiO_{\frac{1}{2}}$ units and $(R^7)_2SiO_{2/2}$ units;

wherein $R^7$ is a monovalent hydrocarbon radical having from 1 to about 6 carbon atoms at least 95% of all $R^7$ groups being an alkyl group, the resinous siloxane copolymers having a hydride content of from about 0.05% to about 1.2% by weight and a hydride equivalent weight of from about 80 to about 2000 grams/silicon-bonded hydrogen atom; and the total of (B), (C) and (D) being from about 25 to about 50 parts by weight; the total of (A), (B), (C) and (D) being 100 parts by weight; the ratio of silicon-bonded hydrogen atoms in (C) and (D) to olefinically unsaturated radicals in the total of (A) and (B) being in the range of from about 1.1:1 to about 15.0:1; (C) and (D) having an average hydride equivalent weight of at least 1500 grams/silicon-bonded hydrogen atom based on the total of silicon-bonded hydrogen atoms in (C) and (D);

(E) a catalytic amount of a hydrosilation catalyst; and (F) from 0 to about 40% by weight of an organic solvent.

2. A composition according to claim 1 wherein (C) is present in an amount sufficient to provide a silicon-bonded hydrogen content in the range of from 20 to about 80 mole % and (D) is present in an amount sufficient to provide a silicon-bonded hydrogen content in the range of from 20 to about 80 mole %.

3. A composition according to claim 2 wherein (C) is present in an amount sufficient to provide a silicon-bonded hydrogen content in the range of from 50 to about 80 mole % and (D) is present in an amount sufficient to provide a silicon-bonded hydrogen content in the range of from 20 to about 50 mole %.

4. A composition according to claim 1 wherein R is a monovalent hydrocarbon radical having from 1 to about 6 carbons and selected from the group consisting essentially of alkyl radicals; cycloaliphatic radicals; olefinic radicals; and phenyl radicals.

5. A composition according to claim 4 wherein R is methyl.

6. A composition according to claim 1 wherein $R^1$ and $R^3$ are each a methyl radical.

7. A composition according to claim 1 wherein $R^2$ is vinyl.

8. A composition according to claim 1 wherein $R^4$ and $R^5$ are each a methyl radical.

9. A composition according to claim 1 wherein $R^6$ and $R^7$ are each a methyl radical.

10. A composition according to claim 1 wherein (A) has a silanol content of from about 1.0 to about 3.0 percent by weight.

11. A composition according to claim 1 wherein (B) has a viscosity of from about 100 to about 300 centipoise at 25° C.

12. A composition according to claim 1 wherein (C) has a viscosity of from about 20 to about 750 centipoise at 25° C.

13. A composition according to claim 12 wherein (C) has a viscosity of from about 100 to about 400 centipoise at 25° C.

14. A composition according to claim 1 wherein (C) has a hydride equivalent weight of from about 800 to about 15,000 grams/silicon-bonded hydrogen atom.

15. A composition according to claim 14 wherein (C) has a hydride equivalent weight of from about 2200 to about 9300 grams/silicon-bonded hydrogen atom.

16. A composition according to claim 1 wherein the ratio of silicon-bonded hydrogen atoms in (C) and (D) to olefinically unsaturated radicals in the total of (A) and (B) is in the range of from about 1.3:1 to about 4.0:1.

17. A composition according to claim 16 wherein the ratio of silicon-bonded hydrogen atoms in (C) and (D) to olefinically unsaturated radicals in the total of (A) and (B) is in the range of from about 1.3:1 to about 3.0:1.

18. A composition according to claim 1 wherein the hydrogen-containing polydiorganosiloxane (D)(1) has a viscosity of from about 5 to about 5000 centipoise at 25° C.

19. A composition according to claim 18 wherein the hydrogen-containing polydiorganosiloxane (D)(1) has a viscosity of from about 5 to about 2500 centipoise at 25° C.

20. A composition according to claim 1 wherein the hydrogen-containing polydiorganosiloxane (D)(1) has a hydride equivalent weight from about 80 to about 2000 grams/silicon-bonded hydrogen atom.

21. A composition according to claim 1 wherein the hydrogen-containing resinous siloxane copolymers (D)(2) have a hydride equivalent weight of from about 80 to about 2000 grams/silicon-bonded hydrogen atom.

22. A composition according to claim 21 wherein the hydrogen-containing resinous siloxane copolymers (D)(2) have has a hydride equivalent weight of from about 80 to about 200 grams/silicon-bonded hydrogen atom.

23. A composition according to claim 1 wherein (A) is present in the amount of from about 50 to about 70 parts by weight.

24. A composition according to claim 23 wherein (A) is present in the amount of from about 55 to about 62 parts by weight.

25. A composition according to claim 1 wherein the total amount of (B), (C), and (D) is from about 30 to about 50 parts by weight.

26. A composition according to claim 25 wherein the total amount of (B), (C), and (D) is from about 38 to about 45 parts by weight.

27. A composition according to claim 1 wherein the hydrogen-containing polydiorganosiloxane (D) is present in an amount such that (D) has a silicon-bonded hydrogen content of from about 20 to about 80 mole % based on the total silicon-bonded hydrogen content of (C) and (D).

28. A composition according to claim 1 wherein the hydrogen-containing polydiorganosiloxane (D) is present in an amount sufficient to provide an average hydride equivalent weight of at least 1500 grams/silicon-bonded hydrogen atom in the total composition.

29. A composition according to claim 1 wherein (C) and (D) have a combined average hydride equivalent weight of from about 1500 to about 20,000 grams/silicon-bonded hydrogen atom in the total composition.

30. A composition according to claim 29 wherein (C) and (D) have an average hydride equivalent weight of from about 1500 to about 5000 grams/silicon-bonded hydrogen atom in the total composition.

31. A composition according to claim 1 wherein composition comprises from about 0 to about 20% by weight of the organic solvent (F).

32. A composition according to claim 31 wherein composition comprises 0% by weight of the organic solvent (F).

33. A composition according to claim 1 further comprising an inhibitor for the hydrosilation catalyst.

34. A composition according to claim 33 wherein the inhibitor is a dialkylmaleate.

35. A composition according to claim 34 wherein the dialkylmaleate is dimethylmaleate.

36. The cured composition of claim 1.

37. An article of manufacture comprising a solid support carrying on at least one surface thereof the cured composition of claim 1.

38. An article of manufacture comprising a solid support carrying on at least one surface thereof the cured composition of claim 1.

39. A pressure sensitive adhesive tape comprising a flexible support carrying on at least one surface thereof the curable composition of claim 1.

40. A pressure sensitive adhesive tape according to claim 39 wherein the flexible support is an impregnated glass cloth, a polyester polymer, a polyimide polymer, or a chemically treated fluorocarbon polymer support.

41. A pressure sensitive adhesive tape comprising a flexible support carrying on at least one surface thereof the cured composition of claim 1.

42. A pressure sensitive adhesive tape according to claim 41 wherein the flexible support is an impregnated glass cloth, a polyester polymer, a polyimide polymer, or a chemically treated fluorocarbon polymer support.

* * * * *